(12) United States Patent
Inoue et al.

(10) Patent No.: US 9,957,883 B2
(45) Date of Patent: *May 1, 2018

(54) CONTROLLER FOR SUPERCHARGER-EQUIPPED INTERNAL COMBUSTION ENGINE

(71) Applicants: Mitsubishi Electric Corporation, Tokyo (JP); MAZDA MOTOR CORPORATION, Aki-gun, Hiroshima (JP)

(72) Inventors: Junichi Inoue, Tokyo (JP); Takahiko Ono, Hyogo (JP); Toshiaki Maruo, Hyogo (JP); Takafumi Nishio, Hiroshima (JP); Yugou Sunagare, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 96 days.

This patent is subject to a terminal disclaimer.

(21) Appl. No.: 15/137,199

(22) Filed: Apr. 25, 2016

(65) Prior Publication Data

US 2017/0051663 A1    Feb. 23, 2017

(30) Foreign Application Priority Data

Aug. 21, 2015  (JP) ................................ 2015-163410

(51) Int. Cl.
    *F02D 23/00* (2006.01)
    *F02B 33/44* (2006.01)
    (Continued)

(52) U.S. Cl.
    CPC .......... *F02B 37/183* (2013.01); *F02D 11/105* (2013.01); *F02D 41/0007* (2013.01);
    (Continued)

(58) Field of Classification Search
    CPC ........ F02B 37/183; F02B 37/18; F02B 37/16; F02D 11/105; F02D 41/0007;
    (Continued)

(56) References Cited

U.S. PATENT DOCUMENTS 6,279,551 B1 * 8/2001 Iwano ................. F02D 41/0007
                                                      60/611
9,062,596 B2 * 6/2015 Maruo ................ F02D 41/0007
(Continued)

FOREIGN PATENT DOCUMENTS

JP     09-228848 A     9/1997
JP     2009-013922 A   1/2009
(Continued)

*Primary Examiner* — Thai Ba Trieu
(74) *Attorney, Agent, or Firm* — Sughrue Mion, PLLC; Richard C. Turner

(57) ABSTRACT

A controller, for a supercharger-equipped internal combustion engine, that can improve the feedback response of compressor driving force is provided. In a controller, inertial force produced by an inertial moment of a supercharger is calculated, based on a real rotation speed of the supercharger; then, driving force feedback control is implemented in which a gate valve control value, which is a control value for a gate valve actuator, is changed so that an addition value obtained by adding the inertial force to the real compressor driving force approaches a target compressor driving force.

7 Claims, 10 Drawing Sheets

(51) Int. Cl.
*F02B 37/18* (2006.01)
*F02D 41/00* (2006.01)
*F02D 41/14* (2006.01)
*F02D 11/10* (2006.01)
*F02D 41/18* (2006.01)

(52) U.S. Cl.
CPC .......... *F02D 41/1445* (2013.01); *F02D 41/18* (2013.01); *F02D 2041/1409* (2013.01); *F02D 2041/1433* (2013.01); *F02D 2250/18* (2013.01); *Y02T 10/144* (2013.01); *Y02T 10/42* (2013.01)

(58) Field of Classification Search
CPC ...... F02D 41/1445; F02D 41/18; F02D 23/00; F02D 41/2432; F02D 2041/1409; F02D 2041/1433; F02D 2250/18; Y02T 10/144; Y02T 10/42
USPC ................. 60/602, 605.1, 611; 701/102–104
See application file for complete search history.

(56) References Cited

U.S. PATENT DOCUMENTS

| | | | |
|---|---|---|---|
| 9,261,031 B2* | 2/2016 | Watanuki | ............ F02D 41/0007 |
| 2013/0131961 A1* | 5/2013 | Ibuki | ................... F02D 41/0007 701/103 |
| 2013/0282256 A1 | 10/2013 | Watanuki et al. | |
| 2015/0113983 A1* | 4/2015 | Yokono | ............... F02D 41/0007 60/605.1 |
| 2015/0240731 A1* | 8/2015 | Yokono | ............... F02D 41/0007 60/611 |
| 2017/0030260 A1* | 2/2017 | Nishio | ................ F02D 41/0007 |

FOREIGN PATENT DOCUMENTS

| | | |
|---|---|---|
| JP | 5420013 B2 | 2/2014 |
| JP | 2017089583 A * | 5/2017 |

* cited by examiner

CONTROLLER FOR SUPERCHARGER-EQUIPPED INTERNAL COMBUSTION ENGINE

INCORPORATION BY REFERENCE

The disclosure of Japanese Patent Application No. 2015-163410 filed on Aug. 21, 2015 including its specification, claims and drawings, is incorporated herein by reference in its entirety.

BACKGROUND OF THE INVENTION

The present invention relates to a controller for an internal combustion engine equipped with a supercharger including an actuator for driving a wastegate valve.

DESCRIPTION OF THE RELATED ART

To date, there has been known a supercharger in which a compressor thereof, which rotates and drives a turbine with exhaust gas, is mounted in an intake path of an internal combustion engine, for the purpose of increasing the output of the internal combustion engine.

Because its supercharging pressure increases more than necessary in the state of a high rotation speed and a high load and hence the internal combustion engine may be broken, the supercharger, in general, has an exhaust gas bypass that bypasses the turbine; the supercharging pressure is controlled at an appropriate level in such a way that a wastegate valve provided in the exhaust gas bypass is opened so that part of exhaust gas is made to enter the exhaust gas bypass in a ramifying manner and hence the amount of the exhaust gas flowing into the turbine is adjusted (e.g., refer to Japanese Patent Application No. JP-A-H09-228848).

As described above, the exhaust pressure and the supercharging pressure of the supercharger are controlled based on the opening degree of the wastegate valve. The control amount of the wastegate valve is determined through closed-loop control or simple open-loop control of an intake-system target amount (e.g., a target supercharging pressure or a target intake amount) to be set based on the rotation speed and the load of the internal combustion engine.

Meanwhile, in recent years, there has been proposed an internal combustion engine controller in which as the output target value of an internal combustion engine, the output axle torque of the internal combustion engine, which is a demanded value of driving force demanded by a driver or from the vehicle side, is utilized and then the air amount, the fuel amount, and the ignition timing, which are control amounts of the internal combustion engine, are determined so that an excellent traveling performance can be obtained. Moreover, it is known that among control amounts for an internal combustion engine, an air amount is a most influential control amount for the output axle torque of the internal combustion engine; thus, there has been provided an internal combustion engine controller that accurately controls air amount (e.g., refer to Japanese Patent Application No. JP-A-2009-013922).

Furthermore, there has been proposed a method in which the conventional wastegate valve control apparatus disclosed in JP-A-H09-228848 is applied to an internal combustion engine controller, such as the one disclosed in JP-A-2009-013922, that determines the output target value of an internal combustion engine. For example, in the technology disclosed in Japanese Patent No. JP-5420013, listed below, a target intake air flow rate (≈ a target charging efficiency) is calculated based on the output target value of an internal combustion engine; a target supercharging pressure is calculated based on the target charging efficiency and the rotation speed; based on the target intake air flow rate and the target supercharging pressure, a target compressor driving force required for driving the supercharger is calculated; then, by use of the characteristic (FIG. 9 in JP-5420013) that the relationship between the exhaust gas flow rate and the compressor driving force (the turbine output) changes in accordance with the control value for the actuator of the wastegate valve, a control value for the actuator of the wastegate valve is calculated based on the exhaust gas flow rate and the target compressor driving force.

SUMMARY OF THE INVENTION

In the technology disclosed in JP-5420013, the control value for the actuator of the wastegate valve is calculated based on the exhaust gas flow rate and the target compressor driving force in a feedforward manner, and the control value for the actuator is changed in a feedback manner so that a real compressor driving force approaches the target compressor driving force. However, in the technology disclosed in JP-5420013, inertial force produced by the inertial moment of the supercharger is not taken into consideration. Accordingly, in the case where the inertial force of the supercharger becomes large in transient driving, no stable feedback response for the real compressor driving force can be obtained; thus, there has been a problem that the overshooting amount and the undershooting amount of the real compressor driving force becomes large.

The present invention has been implemented in order to solve the foregoing problem; the objective thereof is to provide a controller for an internal combustion engine equipped with a supercharger that can improve the feedback response of compressor driving force.

A controller for a supercharger-equipped internal combustion engine according to the present invention is a controller for an internal combustion engine equipped with a supercharger having a turbine provided in an exhaust path, a compressor that is provided at the upstream side of a throttle valve in an intake path and rotates integrally with the turbine, a wastegate valve provided in a bypass path, of the exhaust path, that bypasses the turbine, and a gate valve actuator that drives the wastegate valve; the control method for an internal combustion engine equipped with a supercharger includes a driving-condition detector that detects a real rotation speed of the supercharger, a target compressor driving force calculator that calculates a target compressor driving force, which is a target value of driving force for the compressor, a real compressor driving force calculator that calculates real compressor driving force, which is a real value of driving force for the compressor, a supercharger inertial force calculator that calculates inertial force produced by an inertial moment of the supercharger, based on the real rotation speed of the supercharger, and a gate valve control value calculator that implements driving force feedback control for changing a gate valve control value, which is a control value for the gate valve actuator, so that an addition value obtained by adding the inertial force to the real compressor driving force approaches the target compressor driving force, and performs driving control of the wastegate valve based on the gate valve control value.

The controller for a supercharger-equipped internal combustion engine according to the present invention makes it possible to implement feedback control of compressor driving force while taking inertial force produced by an inertial moment of the supercharger into consideration. Accordingly, even in the case where the inertial force of the supercharger becomes large in transient driving, a stable feedback response for the real compressor driving force can be obtained; thus, the overshooting amount and the undershooting amount of the real compressor driving force can be reduced.

The foregoing and other object, features, aspects, and advantages of the present invention will become more apparent from the following detailed description of the present invention when taken in conjunction with the accompanying drawings.

DETAILED DESCRIPTION OF THE EMBODIMENTS

1. Embodiment 1

Figure 1:
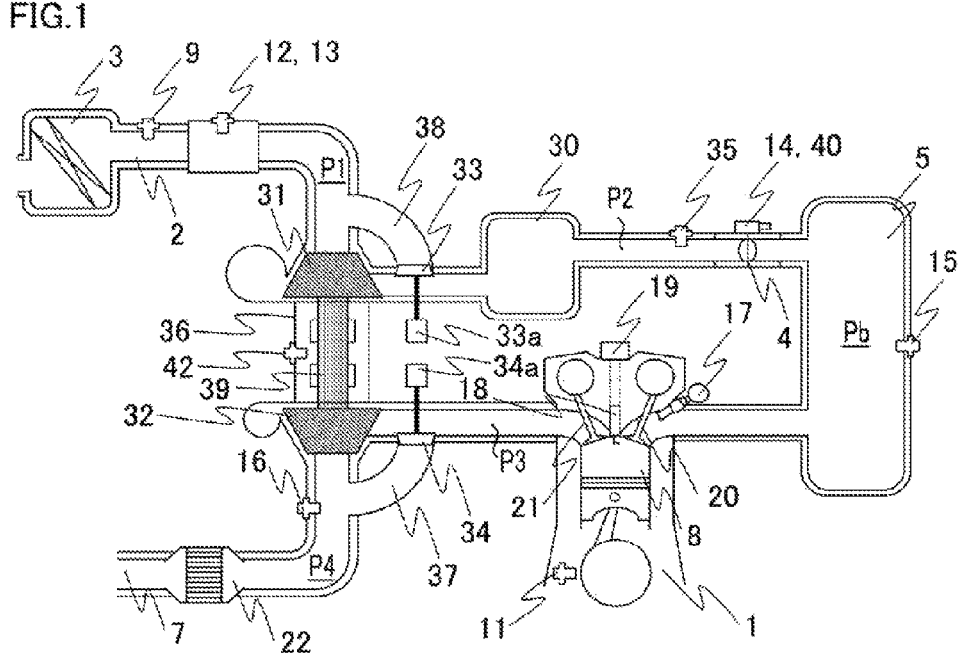
FIG. 1 is a schematic configuration diagram of a supercharger-equipped internal combustion engine according to Embodiment 1 of the present invention.
Figure 2:
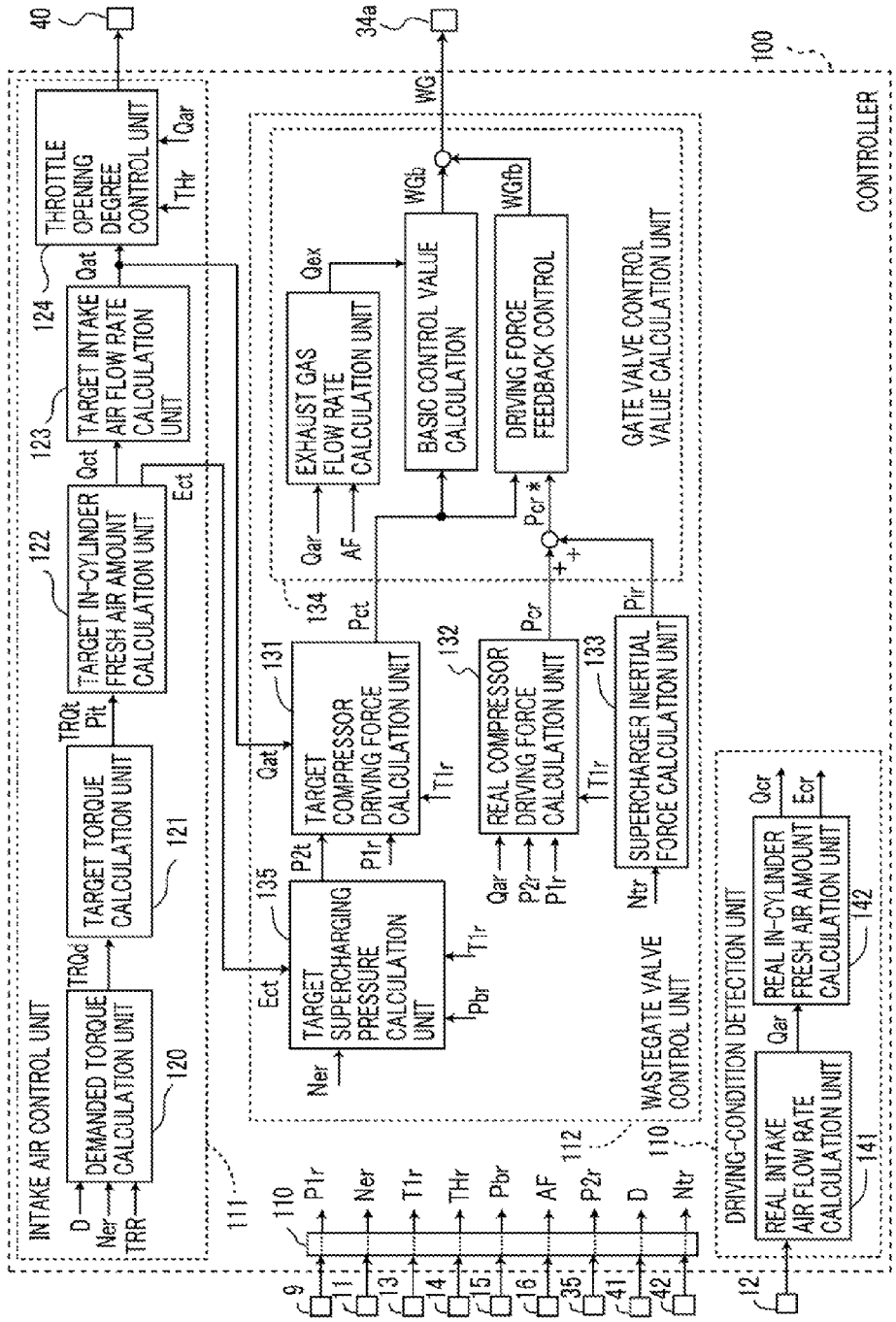
FIG. 2 is a block diagram of a controller for the supercharger-equipped internal combustion engine according to Embodiment 1 of the present invention.

A controller 100 for an internal combustion engine 1 equipped with a supercharger 36 (hereinafter, referred to simply as the controller 100) according to Embodiment 1 will be explained with reference to the drawings. FIG. 1 is a schematic configuration diagram of the internal combustion engine 1 (hereinafter, referred to as the engine 1) equipped with the supercharger 36; FIG. 2 is a block diagram of the controller 100 according to Embodiment 1.

1-1. The Configuration of the Engine 1

At first, the configuration of the engine 1 will be explained. As illustrated in FIG. 1, the engine 1 has a cylinder 8 in which a fuel-air mixture is combusted. The engine 1 and the controller 100 are mounted in a vehicle; the engine 1 functions as a driving force source for the vehicle (wheels). The engine 1 has an intake path 2 for supplying air to the cylinder 8 and an exhaust path 7 for discharging exhaust gas from the cylinder 8. The intake path 2 is formed of an intake pipe and the like; the exhaust path 7 is formed of an exhaust pipe and the like. The intake path 2 has an intake manifold 5 for supplying air to the respective cylinders 8. A throttle valve 4 is provided at a position, in the intake path 2, that is at the upstream side of the intake manifold 5. Accordingly, the intake path 2 at the downstream side of the throttle valve 4 is formed of the intake manifold 5. The engine 1 has the supercharger 36. The supercharger 36 includes a turbine 32 provided in the exhaust path 7, a compressor 31 that is provided at a position, in the intake path 2, that is at the upstream side of the throttle valve 4, and rotates integrally with the turbine 32, a bypass 37 (hereinafter, referred to as an exhaust gas bypass 37), of the exhaust path 7, that bypasses the turbine 32, a wastegate valve 34 provided in the exhaust gas bypass 37, and a gate valve actuator 34a that drives the wastegate valve 34. The exhaust gas bypass 37 is a bypass flow path, for the turbine 32, that connects the portion, of the exhaust path 7, that is at the upstream side of the turbine 32 with the portion, of the exhaust path 7, that is at the downstream side of the turbine 32. The wastegate valve 34 is a valve for changing the flow path area (opening degree) of the exhaust gas bypass 37.

When exhaust gas drives and rotates the turbine 32, the compressor 31 rotates integrally with the turbine 32, compresses air in the intake path 2, and transmits the air to the cylinder 8. The turbine 32 and the compressor 31 are coupled with each other by a turbine shaft 39 in such a way as to integrally rotate on the same axis. A rotation speed sensor 42 that generates an electric signal corresponding to the rotation speed of the turbine shaft 39 is provided on the turbine shaft 39. When the opening degree of the wastegate valve 34 is increased through the gate valve actuator 34a, a wastegate flow rate, out of the exhaust gas flow rate Qex to be exhausted from the engine 1 (cylinder 8), increases; the wastegate flow rate is the flow rate of part of the exhaust gas, which bypasses the turbine 32 so as to flow in the exhaust gas bypass 37. As a result, a turbine flow rate, which is the flow rate of exhaust gas that flows into the turbine 32, decreases. Accordingly, the rotation driving forces of the turbine 32 and the compressor 31 are weakened. The gate valve actuator 34a is an electric one that changes the opening degree of the wastegate valve 34 through the rotation driving force of an electric motor. The gate valve actuator 34a may be an pressure-type one in which a diaphragm is supplied with a pressure obtained by reducing a supercharging pressure P2 by a decompression amount adjusted through a solenoid valve and then the driving force of the diaphragm changes the opening degree of the wastegate valve 34.

In Embodiment 1, the supercharger 36 includes a bypass 38 (hereinafter, referred to as an air bypass 38), of the intake path 2, that bypasses the compressor 31, an air bypass valve 33 provided in the air bypass 38, and a bypass valve actuator 33a that drives the air bypass valve 33. The bypass valve actuator 33a is a pressure-type one having a diaphragm that is actuated by the pressure difference between the supercharging pressure P2 and a manifold pressure Pb. When the supercharging pressure P2 increases to exceed a predetermined pressure difference from the manifold pressure Pb, the diaphragm is activated and hence the air bypass valve 33 is opened; thus, the upstream side and the downstream side of the compressor 31 are connected. Accordingly, it is made possible to prevent mechanical damage to an intake pipe or the like caused by an abnormal rise of the supercharging pressure P2 at a time when the accelerator pedal is released. While an after-mentioned wastegate valve control unit 112 controls the opening degree of the wastegate valve 34, the air bypass valve 33 is basically closed.

An air cleaner 3 for purifying taken-in outer air is mounted at the most upstream side of the intake path 2. At a position that is at the downstream side (the side closer to the cylinder 8) of the air cleaner 3 in the intake path 2 and at the upstream side of the compressor 31, an air flow sensor 12, which generates an electric signal corresponding to an intake air flow rate Qa, and an intake-air temperature sensor 13, which generates an electric signal corresponding to an intake-air temperature T1 in the intake path 2, are provided, as discrete components or as an integrated component (as an integrated component, in this example). An atmospheric pressure sensor 9, which generates an electric signal corresponding to an atmospheric pressure P1, is provided at a position that is at the downstream side of the air cleaner 3 in the intake path 2 and at the upstream side of the compressor 31. The pressure at the upstream side of the compressor 31 can be regarded as being equal to the atmospheric pressure P1. The atmospheric pressure sensor 9 may be contained in the controller 100.

An exhaust gas purification catalyst 22 is provided at the downstream side of the turbine 32 in the exhaust path 7. At a position that is at the downstream side of the turbine 32 in the exhaust path 7 and the upstream side (the side closer to the cylinder 8) of the exhaust gas purification catalyst 22, there is provided an air-fuel ratio sensor 16 that generates an electric signal corresponding to an air-fuel ratio AF, which is the ratio of air to fuel in a combustion gas.

An intercooler 30 for cooling compressed air is provided at the downstream side of the compressor 31 in the intake path 2. The throttle valve 4 for adjusting an air amount to be taken in by the engine 1 is provided at the downstream side of the intercooler 30. The throttle valve 4 is opened or closed by a throttle motor (a motor for driving the throttle valve) 40. The throttle valve 4 is connected with a throttle position sensor 14 that generates an electric signal corresponding to a throttle opening degree, which is the opening degree of the throttle valve 4. In a supercharging intake path, which is part, of the intake path 2, that is at downstream side of the compressor 31 and at the upstream side of the throttle valve 4, there is provided a supercharging pressure sensor 35 that generates an electric signal corresponding to the supercharging pressure P2, which is the pressure of air in the supercharging intake path.

The part, of the intake path 2, that is at the downstream side of the throttle valve 4 constitutes the intake manifold 5, which functions also as a surge tank for suppressing an intake-air ripple. A manifold pressure sensor 15 that generates an electric signal corresponding to the manifold pressure Pb, which is the pressure of air in the intake manifold 5, is provided in the intake manifold 5. Unlike Embodiment 1 in which both the air flow sensor 12 and the manifold pressure sensor 15 are provided, the supercharger-equipped internal combustion engine may be provided only with the manifold pressure sensor 15 but with no air flow sensor 12. In the case where only the manifold pressure sensor 15 is provided, it may be allowed that the intake-air temperature sensor 13 is provided in the intake manifold 5 so as to detect the intake-air temperature inside the intake manifold 5.

An injector 17 for injecting a fuel is provided at the downstream side (the side closer to the cylinder 8) of the intake manifold 5. The injector 17 may be provided in such a way as to inject a fuel directly into the cylinder 8.

In the top portion of the cylinder 8, there are provided an ignition plug 18 for igniting an inflammable fuel-air mixture produced by mixing air taken into the cylinder 8 with a fuel injected from the injector 17 and an ignition coil 19 for generating energy with which the ignition plug 18 throws sparks. There are also provided an intake valve 20 for adjusting the intake air amount to be taken from the intake path 2 into the cylinder 8 and an exhaust valve 21 for adjusting the exhaust gas amount to be exhausted from the cylinder 8 to the exhaust path 7. On the crankshaft of the engine 1, there is provided a crank angle sensor 11 for generating an electric signal corresponding to the rotation angle of the engine 1.

1-2. The Configuration of the Controller 100

Figure 3:
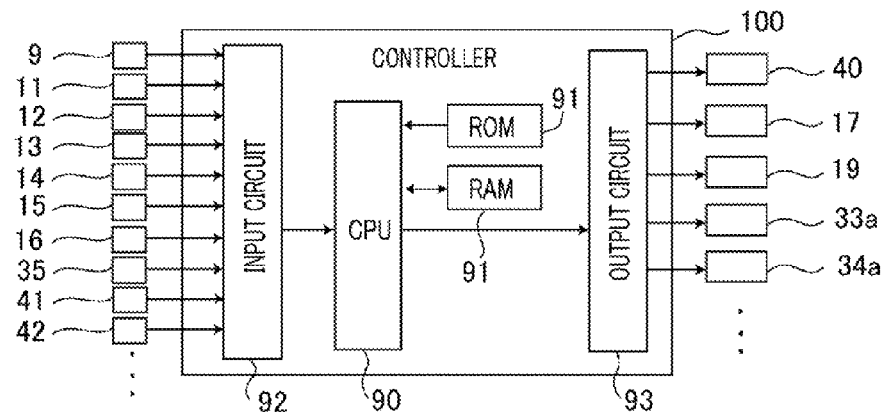
FIG. 3 is a hardware configuration diagram of the controller for the supercharger-equipped internal combustion engine according to Embodiment 1 of the present invention.

Next, the configuration of the controller 100 will be explained. The controller 100 is a controller whose control subject is the engine 1 equipped with the supercharger 36. Respective control units 110 through 112 and the like provided in the controller 100 are realized by processing circuits included in the controller 100. Specifically, as illustrated in FIG. 3, the controller 100 includes, as processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like. As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with various kinds of sensors and switches and is provided with an A/D converter, an input port, and the like for inputting output signals from the sensors and the switches to the computing processing unit 90. The output circuit 93 is connected with electric loads and is provided with a driving circuit, an output port, and the like for outputting a control signal from the computing processing unit 90 to the electric loads. In addition, the computing processing unit 90 runs software items (programs) stored in the storage apparatus 91 such as a ROM and collaborates with other hardware devices in the controller 100, such as the storage apparatus 91, the input circuit 92, and the output circuit 93, so that the respective functions of the control units 110 through 112 included in the controller 100 are realized. Setting data items such as maps and setting values to be utilized in the control units 110 through 112 are stored, as part of software items (programs), in the storage apparatus 91 such as a ROM.

In Embodiment 1, the input circuit 92 is connected with various kinds of sensors such as the atmospheric pressure sensor 9, the crank angle sensor 11, the air flow sensor 12, the intake-air temperature sensor 13, the throttle position sensor 14, the manifold pressure sensor 15, the air-fuel ratio sensor 16, the supercharging pressure sensor 35, an accelerator position sensor 41 for generating an electric signal corresponding to an accelerator operating amount, and rotation speed sensor 42 in the supercharger 36. The output circuit 93 is connected with various kinds of actuators such as the throttle motor 40, the injector 17, the ignition coil 19, the bypass valve actuator 33a, and the gate valve actuator 34a. Although not illustrated, the input circuit 92 is connected with a sensor for controlling the combustion in the engine 1 and sensors (e.g., a vehicle speed sensor, a water temperature sensor, and the like) for controlling the behavior of the vehicle.

As basic control, the controller 100 calculates the fuel injection amount and the ignition timing, based on inputted output signals and the like from the various kinds of sensors so as to perform driving control of a fuel ignition apparatus, an ignition apparatus, and the like (unillustrated). Although the details will be explained later, based on the output signal of the accelerator sensor 41 and the like, the controller 100 calculates a demanded output torque demanded on the engine 1, and then controls the throttle valve 4, the wastegate valve 34, and the like so that an intake air amount for realizing the demanded output torque is obtained.

1-2-1. Driving-Condition Detection Unit 110

The controller 100 is provided with a driving-condition detection unit 110 (corresponding to a driving-condition detector) that detects the driving conditions of the engine 1 and the vehicle. The driving-condition detection unit 110 detects a real rotation speed Ntr of the supercharger 36 (the compressor 31 and the turbine 32). In Embodiment 1, the driving-condition detection unit 110 detects the real rotation speed Ntr of the supercharger 36, based on the output signal of the rotation speed sensor 42 provided in the supercharger 36.

Figure 4:
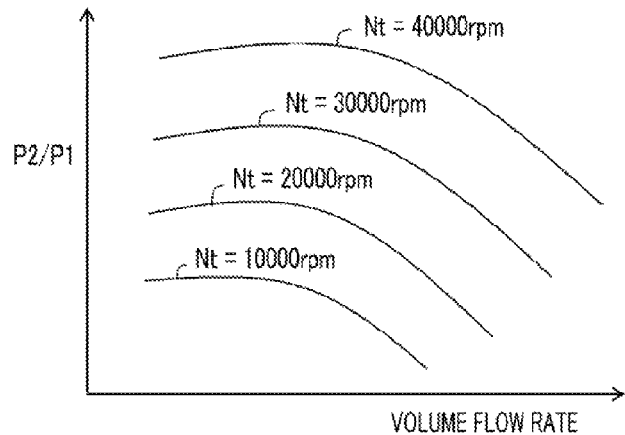
FIG. 4 is a graph for explaining a map utilized in estimation of a rotation speed of a supercharger according to Embodiment 1 of the present invention.

Alternatively, the driving-condition detection unit 110 may detect the real rotation speed Ntr of the supercharger 36, based on a real intake air flow rate Qar and a real before/after-compressor pressure ratio P2r/P1r, which is the pressure ratio of a real supercharging pressure P2r and a real atmospheric pressure P1r. Specifically, by use of a rotation speed map, as represented in FIG. 4, in which the relationship among the intake-air volume flow rate obtained by dividing the intake air flow rate Qa by the air density, a before/after-compressor pressure ratio P2/P1, which is the pressure ratio of the supercharging pressure P2 and the atmospheric pressure P1, and a rotation speed Nt of the supercharger 36 is preliminarily set, the driving-condition detection unit 110 calculates the real rotation speed Ntr of the supercharger 36 corresponding to a real volume flow rate obtained by dividing the real intake air flow rate Qar by the air density and the real before/after-compressor pressure ratio P2r/P1r. FIG. 4 represents an iso-rotation speed line obtained by connecting points at which the respective rotation speeds Nt become equal to one another when the volume flow rate and the before/after-compressor pressure ratio P2/P1 are changed.

The driving-condition detection unit 110 detects the real rotation speed Ner of the engine 1, the real intake air flow rate Qar, and the real atmospheric pressure P1r. Specifically, the driving-condition detection unit 110 detects the real rotation speed Ner of the engine 1, based on the output signal of the crank angle sensor 11, detects the real intake air flow rate Qar of the engine 1, based on the output signal of the air flow sensor 12 or the manifold pressure sensor 15, and detects the real atmospheric pressure P1r, based on the output signal of the atmospheric pressure sensor 9.

In addition to the foregoing driving conditions, the driving-condition detection unit 110 detects various kinds of driving conditions such as a real intake air temperature T1r, a real throttle opening degree THr, a real manifold pressure Pbr, an exhaust gas air-fuel ratio AF, a real supercharging pressure P2r, and an accelerator opening degree D. Specifically, the driving-condition detection unit 110 detects the real intake air temperature T1r, based on the output signal of the intake-air temperature sensor 13, detects the real throttle opening degree THr, based on the output signal of the throttle position sensor 14, detects the real manifold pressure Pbr, based on the output signal of the manifold pressure sensor 15, detects the exhaust gas air-fuel ratio AF, based on the output signal of the air-fuel ratio sensor 16, detects the real supercharging pressure P2r, based on the output signal of the supercharging pressure sensor 35, and detects the accelerator opening degree D, based on the output signal of the accelerator position sensor 41.

<Real Intake Air Flow Rate Calculation Unit 141>

The driving-condition detection unit 110 is provided with a real intake air flow rate calculation unit 141. The real intake air flow rate calculation unit 141 calculates the real intake air flow rate Qar, which is the flow rate of air that is taken in by the engine 1 (the intake path 2). In Embodiment 1, based on the output signal of the air flow sensor 12 or the manifold pressure sensor 15 (in this example, the air flow sensor 12), the real intake air flow rate calculation unit 141 calculates the real intake air flow rate Qar[g/s].

<Real In-Cylinder Fresh Air Amount Calculation Unit 142>

The driving-condition detection unit 110 is provided with a real in-cylinder fresh air amount calculation unit 142. Based on the output signal of the air flow sensor 12 or the manifold pressure sensor 15 (in this example, the air flow sensor 12), the real in-cylinder fresh air amount calculation unit 142 calculates a real charging efficiency Ecr and a real in-cylinder fresh air amount Qcr.

In Embodiment 1, as represented in the equation (1) below, the real in-cylinder fresh air amount calculation unit 142 applies first-order-lag filter processing, which simulates a delay in the intake manifold 5 (surge tank), to the value obtained by multiplying the real intake air flow rate Qar by the stroke period $\Delta T$ (in this example, the interval of BTDC5degCA), in order to calculate the real in-cylinder fresh air amount Qcr per stroke [g/stroke].

$$Qcr(n) = KCCA \times Qcr(n-1) + (1 - KCCA) \times Qar(n) \times \Delta T(n) \quad (1)$$

where KCCA is a filter coefficient.

Alternatively, it may be allowed that as represented in the equation (2) below, the real in-cylinder fresh air amount calculation unit 142 calculates the volume of air, in the intake manifold 5, that has been taken in by the cylinder 8, by multiplying a volumetric efficiency Kv on the basis of the intake manifold 5 by a cylinder volume Vc, and then multiplies the calculated air volume by an air density $\rho b$, which is calculated based on the real manifold pressure Pbr and the real intake air temperature T1r, in order to calculate the real in-cylinder fresh air amount Qcr[g/stroke]. In the equation (2), the volumetric efficiency Kv is the ratio of the volume of air, in the intake manifold 5, that is taken in by the cylinder, to the cylinder volume Vc (Kv=the volume of air in the intake manifold 5 taken in by the cylinder 8/Vc). By use of a map in which the relationship among the rotation speed Ne, the manifold pressure Pb, and the volumetric efficiency Kv is preliminarily set, the real in-cylinder fresh air amount calculation unit 142 calculates the volumetric efficiency Kv corresponding to the real rotation speed Ner and the real manifold pressure Pbr.

$$Qcr = (Kv \times Vc) \times \rho b, \rho b = Pbr/(R \times T1r) \qquad (2)$$

where R is a gas constant.

As represented in the equation (3) below, the real in-cylinder fresh air amount calculation unit 142 calculates the real charging efficiency Ecr by dividing the real in-cylinder fresh air amount Qcr by a value obtained by multiplying the density of air under the standard atmospheric condition by the cylinder volume Vc. The real charging efficiency Ecr is the ratio of the real in-cylinder fresh air amount Qcr to the density (×Vc) of air under the standard atmospheric condition, with which the cylinder volume Vc is filled. The standard atmospheric condition denotes the state of 1 atm and 25° C.

$$Ecr = Qcr/(\rho 0 \times Vc) \qquad (3)$$

1-2-2. Intake Air Control Unit 111

The controller 100 is provided with an intake air control unit 111 (corresponding to an intake air controller) that controls intake air of the engine 1. The intake air control unit 111 calculates a target intake air flow rate Qat, which is a target value of the intake air flow rate Qa, and a target charging efficiency Ect, which is a target value of the charging efficiency Ec.

In Embodiment 1, the intake air control unit 111 includes a demanded torque calculation unit 120 that calculates a demanded output torque TRQd, which is the output torque demanded on the engine 1, a target torque calculation unit 121 that calculates a target output torque TRQt or a target indicated mean effective pressure Pit, based on the demanded output torque TRQd, a target in-cylinder fresh air amount calculation unit 122 that calculates the target charging efficiency Ect and the target in-cylinder fresh air amount Qct, based on the target output torque TRQt or the target indicated mean effective pressure Pit, a target intake air flow rate calculation unit 123 that calculates the target intake air flow rate Qat, based on the target in-cylinder fresh air amount Qct, and a throttle opening degree control unit 124 that controls the throttle opening degree, based on the target intake air flow rate Qat.

Hereinafter, the control units 120 through 124 in the intake air control unit 111 will be explained in detail.

<Demanded Torque Calculation Unit 120>

The demanded torque calculation unit 120 calculates the demanded output torque TRQd, based on the accelerator opening degree D and a demand from an external controller. Based on the real rotation speed Ner of the engine 1 (or a traveling speed VS of the vehicle) and the accelerator opening degree D, the demanded torque calculation unit 120 calculates a driver-demanded output torque, which is an output torque, of the engine 1, that is demanded by the driver of the vehicle. Specifically, by use of a map in which the relationship among the real rotation speed Ner of the engine 1 (or the traveling speed VS), the accelerator opening degree D, and the driver-demanded output torque is preliminarily set, the demanded torque calculation unit 120 calculates driver-demanded output torque corresponding to the real rotation speed Ner (or the traveling speed VS) and the accelerator opening degree D.

An external controller (e.g., a transmission controller, a brake controller, a controller for traction control, or the like) inputs an external demanded output torque TRR to the controller 100. In accordance with the driving condition, the demanded torque calculation unit 120 selects one of the driver-demanded output torque and the external demanded output torque TRR and then outputs the selected torque, as the demanded output torque TRQd. The demanded output torque TRQd denotes the demanded value of torque outputted from the crankshaft of the engine 1.

<Target Torque Calculation Unit 121>

The target torque calculation unit 121 calculates the target output torque TRQt or the target indicated mean effective pressure Pit, based on the demanded output torque TRQd. The target torque calculation unit 121 calculates a load of an engine auxiliary apparatus corresponding to the real driving condition such as the real rotation speed Ner, by use of a map in which the relationship between the driving condition such as the rotation speed Ne and the load of the engine auxiliary apparatus is preliminarily set, based on experimental data obtained by measuring the respective loads of various kinds of engine auxiliary apparatuses (e.g., an alternator, an air conditioner compressor, a power steering pump, a transmission pump, a torque converter, and the like). The target torque calculation unit 121 adds the load (an absolute value) of an engine auxiliary apparatus to the demanded output torque TRQd so as to output an engine demanded output torque at a time when the load of an engine auxiliary apparatus is taken into consideration.

Next, the target torque calculation unit 121 calculates engine loss corresponding to the real driving condition such as the real rotation speed Ner, by use of a map in which the relationship between the driving condition such as the rotation speed Ne and the engine loss is preliminarily set, based on real data obtained by measuring mechanical loss and pumping loss inherent in the engine 1 (collectively, referred to as engine loss). Then, the target torque calculation unit 121 adds the engine loss (an absolute value) to the engine demanded output torque so as to calculate the target indicated mean effective pressure Pit to be produced in the cylinder 8. It may be allowed that the target torque calculation unit 121 calculates the target output torque TRQt, instead of the target indicated mean effective pressure Pit.

<Target In-Cylinder Fresh Air Amount Calculation Unit 122>

The target in-cylinder fresh air amount calculation unit 122 calculates the target in-cylinder fresh air amount Qct and the target charging efficiency Ect, based on the target indicated mean effective pressure Pit or the target output torque TRQt. The target in-cylinder fresh air amount calculation unit 122 calculates the target in-cylinder fresh air amount Qct [g/stroke] and the target charging efficiency Ect, based on the target indicated mean effective pressure Pit or the target output torque TRQt, the target value of the air-fuel ratio AF, and the thermal efficiency η. By use of a map in which the relationship among the rotation speed Ne, the charging efficiency Ec, and the thermal efficiency η is preliminarily set, the target in-cylinder fresh air amount calculation unit 122 calculates the thermal efficiency η corresponding to the real rotation speed Ner and the real charging efficiency Ecr. The cylinder volume Vc denotes a stroke volume [L] per one cylinder of the cylinder 8.

As represented in the equation (4) below, the target in-cylinder fresh air amount calculation unit 122 calculates the target in-cylinder fresh air amount Qct and the target charging efficiency Ect, based on the target indicated mean effective pressure Pit, the target value of the air-fuel ratio AF, and the thermal efficiency η.

$$Qct = AF \times Pit \times Vc/(\eta \times 44000)$$

$$Ect = AF \times Pit/(\eta \times 44000 \times) \qquad (4)$$

where "44000" is a heat generation amount per unit mass [J/kg] of a fuel (in this example, gasoline) to be utilized in the engine 1. By use of a map in which the relationship among the rotation speed Ne, the charging efficiency Ec, and the thermal efficiency η is preliminarily set, the target in-cylinder fresh air amount calculation unit 122 calculates the thermal efficiency η corresponding to the real rotation speed Ner and the real charging efficiency Ecr.

It may be allowed that the target in-cylinder fresh air amount calculation unit 122 calculates the target charging efficiency Ect by dividing the target in-cylinder fresh air amount Qct by the preliminarily set mass (ρ0×Vc) of air with which the cylinder volume Vc is filled under the standard atmospheric condition. The target charging efficiency Ect and the target in-cylinder fresh air amount Qct are values that correlate to each other; based on the calculated value of one of them, the value of the other one is calculated.

<Target Intake Air Flow Rate Calculation Unit 123>

Based on the target in-cylinder fresh air amount Qct, the target intake air flow rate calculation unit 123 calculates the target intake air flow rate (amount) Qat [g/s] to be taken in by the engine 1 through the intake path 2. In Embodiment 1, as represented in the equation (5) below, the target intake air flow rate calculation unit 123 obtains a value by applying first-order advance filtering processing, which has a characteristic reverse to that of the foregoing first-order lag filtering processing represented in the equation (1), to the target in-cylinder fresh air amount Qct; then, the target intake air flow rate calculation unit 123 divides the obtained value by the stroke period ΔT so as to calculate the target intake air flow rate Qat. The target intake air flow rate Qat corresponds to the target value of the flow rate of air that passes through the intake path 2 (for example, the throttle valve 4) at the upstream side of the intake manifold 5 (the surge tank). In this example, the stroke period ΔT is set to in the interval of BTDC5degCA; in the case of a four-cylinder engine, the stroke period ΔT is the interval of 180degCA; in the case of a three-cylinder engine, the stroke period ΔT is the interval of 240degCA.

$$Qat(n) = \{1/(1-KCCA) \times Qct(n) - KCCA/(1-KCCA) \times Qct(n-1)\}/\Delta T(n) \qquad (5)$$

<Throttle Opening Degree Control Unit 124>

The throttle opening degree control unit 124 controls the throttle opening degree, based on the target intake air flow rate Qat. Based on the target intake air flow rate Qat, the throttle opening degree control unit 124 sets a target throttle opening degree THt and then applies driving control to the throttle motor 40 so that the real throttle opening degree THr approaches a target throttle opening degree THt. The throttle opening degree control unit 124 implements learning control for correcting the target throttle opening degree THt so that the real intake air flow rate Qar approaches the target intake air flow rate Qat.

1-2-3. Wastegate Valve Control Unit 112

The controller 100 is provided with the wastegate valve control unit 112. The wastegate valve control unit 112 performs driving control of the wastegate valve 34 so as to control driving force for the compressor 31. As represented in FIG. 2, the wastegate valve control unit 112 includes a target compressor driving force calculation unit 131 (corresponding to a target compressor driving force calculator), a real compressor driving force calculation unit 132 (corresponding to a real compressor driving force calculator), a supercharger inertial force calculation unit 133 (corresponding to a supercharger inertial force calculator), a gate valve control value calculation unit 134 (corresponding to a gate valve control value calculator), and the like.

The target compressor driving force calculation unit 131 calculates a target compressor driving force Pct, which is a target value of the driving force for the compressor 31. The real compressor driving force calculation unit 132 calculates a real compressor driving force Pcr, which is a real value of the driving force for the compressor 31. Based on the real rotation speed Ntr of the supercharger 36, the supercharger inertial force calculation unit 133 calculates inertial force Pir produced by an inertial moment It of the supercharger 36. The gate valve control value calculation unit 134 implements driving force feedback control for changing a gate valve control value WG so that an addition value Pcr* (hereinafter, referred to as inertial force added driving force Pcr*) obtained by adding the inertial force Pir to the real compressor driving force Pcr approaches the target compressor driving force Pct, and performs driving control of the wastegate valve 34 based on the gate valve control value WG.

Figure 5:
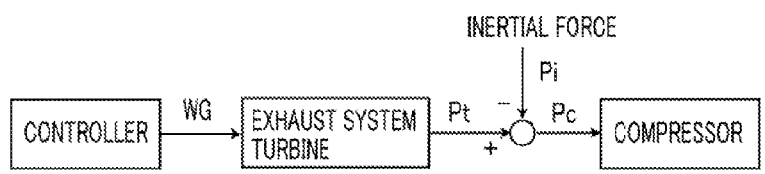
FIG. 5 is a block diagram for explaining the control system of a wastegate valve according to Embodiment 1 of the present invention.

As represented in FIG. 5 in which a block diagram shows a control system in a schematic manner, when the gate valve control value calculation unit 134 (controller) changes the gate valve control value WG, the opening degree of the wastegate valve 34 changes and hence a turbine output Pt, which is driving force for the supercharger 36, changes. In other words, when the opening degree of the wastegate valve 34 is changed, the turbine flow rate, which is the flow rate of exhaust gas that flows through the turbine 32, and the pressure at the upstream side of the turbine 32 change; thus, the turbine output Pt to be generated by the turbine 32 changes. Then, the turbine output Pt is transmitted to the compressor 31, where the turbine output Pt becomes driving force to be consumed in the compressor 31. As described above, the direct control subject of the wastegate valve 34 is the exhaust system around the turbine 32 and the turbine 32; the control system is configured in such a way that when the opening degree of the wastegate valve 34 is changed, the conditions of the exhaust system and the turbine 32 are changed and hence the turbine output Pt is changed.

Instead of directly detecting the turbine output Pt, the wastegate valve control unit 112 detects driving force actually consumed by the compressor 31, i.e., the real compressor driving force Pcr. However, the turbine output Pt and the real compressor driving force Pcr do not completely coincide with each other. That is to say, the turbine output Pt is consumed also by inertial force Pi produced by the inertial moment It of the supercharger 36. Thus, the output obtained by subtracting the inertial force Pi from the turbine output Pt is the compressor driving force Pc that is consumed by the compressor 31.

Figure 6:
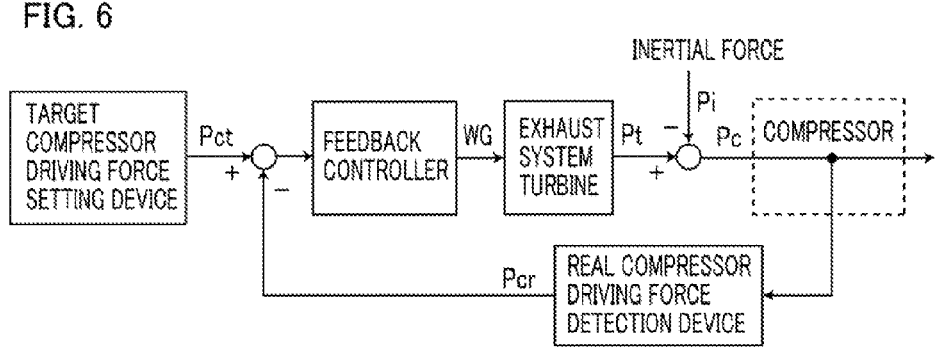
FIG. 6 is a block diagram for explaining a feedback control system according to a comparative example of the present invention.

FIG. 6 represents a comparative example in which unlike Embodiment 1, the gate valve control value WG is changed so that the detected real compressor driving force Pcr approaches the target compressor driving force Pct. In the case of this comparative example, the inertial force Pi works as a disturbance component in the feedback system, which changes the turbine output Pt. In a transient response after the target compressor driving force Pct has been changed, the rotation speed of the supercharger 36 changes; thus, the inertial force Pi becomes large. As a result, the transient response of the feedback system is disturbed by the disturbance component of the inertial force Pi; thus, there have been problems, for example, that no stable transient response of the real compressor driving force Pcr is obtained and that the feedback control gain for obtaining a stable transient response of the real compressor driving force Pcr cannot appropriately be set.

Figure 7:
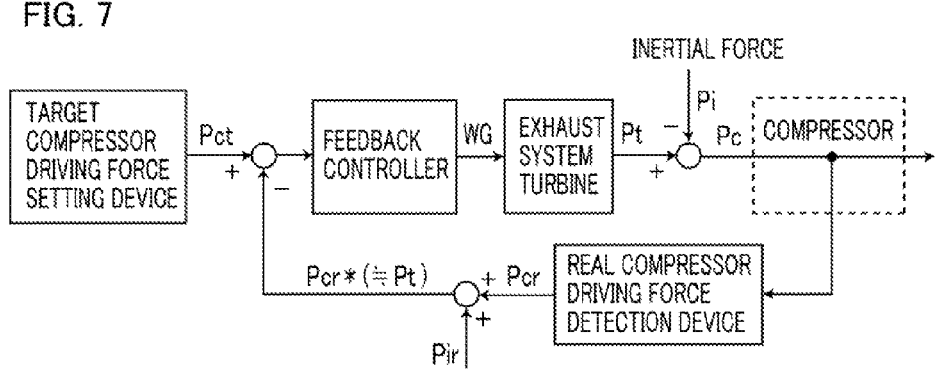
FIG. 7 is a block diagram for explaining a feedback control system according to Embodiment 1 of the present invention.

Accordingly, as represented in FIG. 7, Embodiment 1 is configured in such a way that as described above, the inertial force added driving force Pcr*, which is a value corresponding to the turbine output Pt, is calculated by adding the calculated inertial force Pir to the detected real compressor driving force Pcr, and then the gate valve control value WG is changed so that the inertial force added driving force Pcr* approaches the target compressor driving force Pct. Thus, in the feedback control system in which the turbine output Pt is changed, the inertial force Pi, which works as a disturbance component, can be compensated and hence the feedback control can be implemented by use of the inertial force added driving force Pcr* corresponding to the turbine output Pt. Accordingly, it is made possible to obtain a stable transient response of the desired inertial force added driving force Pcr* for a change in the target compressor driving force Pct and to appropriately set the feedback control gain for obtaining the stable transient response of the desired inertial force added driving force Pcr*. Because the stable transient response of the desired inertial force added driving force Pcr* can be obtained, the transient response of the real compressor driving force Pcr obtained by subtracting the inertial force Pir from the inertial force added driving force Pcr* stabilizes and hence the feedback control gain can be adjusted so that the transient response of the desired real compressor driving force Pcr is realized.

Hereinafter, the respective configurations of the control units in the wastegate valve control unit 112 will be explained in detail.

<Target Supercharging Pressure Calculation Unit 135>

The wastegate valve control unit 112 is provided with a target supercharging pressure calculation unit 135 (corresponding to a target supercharging pressure calculator) for calculating a target supercharging pressure P2t to be utilized in calculation of the target compressor driving force Pct.

Based on the target charging efficiency Ect and the real rotation speed Ner of the engine 1, the target supercharging pressure calculation unit 135 calculates the target supercharging pressure P2t, which is the target value of the supercharging pressure P2 that is the pressure at a position, in the intake path 2, that is at the downstream side of the compressor 31 and at the upstream side of the throttle valve 4.

In Embodiment 1, based on the real rotation speed Ner of the engine 1 and the real manifold pressure Pbr, the target supercharging pressure calculation unit 135 calculates the volumetric efficiency Kv on the basis of the intake manifold 5; based on the volumetric efficiency Kv, the target charging efficiency Ect, and the real intake air temperature T1r, the target supercharging pressure calculation unit 135 calculates a target manifold pressure Pbt, which is the target value of the pressure in the intake manifold 5; then, the target supercharging pressure calculation unit 135 adds a pressure addition value KP2 to the target manifold pressure Pbt so as to calculate the target supercharging pressure P2t. The volumetric efficiency Kv is a volumetric efficiency Kv on the basis of the volume of air in the intake manifold 5, i.e., the ratio of the volume of air, in the intake manifold 5, that is taken in by the cylinder 8, to the cylinder volume Vc (Kv=the volume of air, in the intake manifold 5, taken in by the cylinder 8/Vc). As is the case with the real in-cylinder fresh air amount calculation unit 142, the target supercharging pressure calculation unit 135 calculates the volumetric efficiency Kv corresponding to the real rotation speed Ner and the real manifold pressure Pbr, by use of a map in which the relationship among the rotation speed Ne, the manifold pressure Pb, and the volumetric efficiency Kv is preliminarily set.

As represented in the equation (6) below, the target supercharging pressure calculation unit 135 calculates the pressure addition value KP2 corresponding to the target charging efficiency Ect and the real rotation speed Ner, by use of a pressure addition value map MAPKp2 in which the relationship among the rotation speed Ne, the target charging efficiency Ect, and the pressure addition value KP2 is preliminarily set. Then, the target supercharging pressure calculation unit 135 adds the pressure addition value KP2 to the target manifold pressure Pbt so as to calculate the target supercharging pressure P2t. The pressure addition value KP2 is a value for securing the pressure difference between the pressure before the throttle valve 4 and the pressure after the throttle valve 4 and controlling the intake air flow rate Qa by the throttle valve 4. It may be allowed that the pressure addition value KP2 is set to a fixed value of approximately 5 [kPa].

$$P2t = Pbt + KP2$$

$$KP2 = MAPKp2(Ect, Ner) \quad (6)$$

<Target Compressor Driving Force Calculation Unit 131>

The target compressor driving force calculation unit 131 calculates the target compressor driving force Pct, which is a target value of driving force for the compressor 31.

In Embodiment 1, the target compressor driving force calculation unit 131 calculates the target compressor driving force Pct, based on the target intake air flow rate Qat and the target before/after-compressor pressure ratio P2t/P1r, which is the pressure ratio of the target supercharging pressure P2t and the real atmospheric pressure P1r.

Here, the basic characteristics of the compressor 31 and the turbine 32 will be explained. Taking the mass conservation law, the polytropic change, and the adiabatic efficiency, which are physical laws regarding the state of air, into consideration, the turbine output Pt[W] and the compressor driving force Pc[W] can be calculated through the theoretical equation (7) below.

$$Pt = Qt \cdot \eta t \cdot Wt = \qquad (7)$$
$$Qt \cdot \eta t \cdot Cp \cdot T3\left(1 - \left(\frac{P4}{P3}\right)^{\frac{\kappa-1}{\kappa}}\right) = Qt \cdot \eta t \frac{\kappa}{\kappa-1} R \cdot T3\left(1 - \left(\frac{P4}{P3}\right)^{\frac{\kappa-1}{\kappa}}\right)$$

$$Pc = \frac{Qcmp \cdot Wc}{\eta c} = Qcmp \frac{1}{\eta c} Cp \cdot T1\left(\left(\frac{P2}{P1}\right)^{\frac{\kappa-1}{\kappa}} - 1\right) =$$
$$Qcmp \frac{1}{\eta c} \frac{\kappa}{\kappa-1} R \cdot T1\left(\left(\frac{P2}{P1}\right)^{\frac{\kappa-1}{\kappa}} - 1\right)$$

$$\because Cp = \frac{\kappa}{\kappa-1} R$$

where Cp is a constant-pressure specific heat[kJ/(kg·K)]; Wt is a turbine output[J] per unit flow rate; Wc is a compressor work[J] per unit flow rate; κ is a specific heat ratio; Qt is the mass flow rate [g/s] of exhaust gas that passes through the turbine 32; Qcmp is the mass flow rate[g/s] of air that passes through the compressor 31; R is a gas constant[kJ/(kg·K)], ηt is the adiabatic efficiency of the turbine 32; ηc is the adiabatic efficiency of the compressor 31; T3 is the temperature of exhaust gas; P3 is the pressure at the upstream side of the turbine 32; P4 is the pressure at the downstream side of the turbine 32.

Because in the normal state, the air bypass valve 33 is basically closed and hence all the intake air (the intake air flow rate Qa) passes through the compressor 31, it can be assumed, in the equation (7) above, that the intake air flow rate Qa is equal to the compressor-passing flow rate Qcmp. Accordingly, the compressor driving force Pc can be calculated through the equation (8) below, by use of the intake air flow rate Qa, the before/after-compressor pressure ratio P2/P1, which is the ratio of the supercharging pressure P2 and the atmospheric pressure P1, and the intake-air temperature T1.

$$Pc = Qa \frac{1}{\eta c} \frac{\kappa}{\kappa-1} R \cdot T1 \left( \left( \frac{P2}{P1} \right)^{\frac{\kappa-1}{\kappa}} - 1 \right) \quad (8)$$

As represented in the equation (9) below, the target compressor driving force calculation unit 131 calculates the target compressor driving force Pct, based on the target intake air flow rate Qat, the target before/after-compressor pressure ratio P2t/P1r, which is the pressure ratio of the target supercharging pressure P2t and the real atmospheric pressure P1r, a target adiabatic efficiency ηct of the compressor 31, and the real intake air temperature T1r. In this situation, the target compressor driving force calculation unit 131 calculates a pressure ratio correction coefficient F1 corresponding to the target before/after-compressor pressure ratio P2t/P1r, which is the pressure ratio of the target supercharging pressure P2t and the real atmospheric pressure P1r, by use of a pressure ratio correction coefficient map MAPF1 in which based on the theoretical equation (9) below, the relationship between the pressure ratio correction coefficient F1 and the before/after-compressor pressure ratio P2/P1, which is the pressure ratio of the supercharging pressure P2 to the atmospheric pressure P1, is preliminarily set.

$$Pct = Qat \frac{1}{\eta ct} T1r \cdot F1 \quad (9)$$

$$F1 = MAPF1\left(\frac{P2t}{P1r}\right),$$

$$\because MAPF1\left(\frac{P2}{P1}\right) \cong \frac{\kappa}{\kappa-1} R\left(\left(\frac{P2}{P1}\right)^{\frac{\kappa-1}{\kappa}} - 1\right)$$

As represented in the equation (10) below, the target compressor driving force calculation unit 131 calculates the target adiabatic efficiency ηct corresponding to the target intake air flow rate Qat and the target before/after-compressor pressure ratio P2t/P1r, by use of an adiabatic efficiency calculation map MAPηc in which the relationship among the intake air flow rate Qa, the before/after-compressor pressure ratio P2/P1, and the adiabatic efficiency ηc of the compressor 31 is preliminarily set. It may be allowed that the target compressor driving force calculation unit 131 calculates target compressor driving force Pct without considering the change in the adiabatic efficiency, for example, by setting the target adiabatic efficiency ηct to a fixed value.

$$\eta ct = MAP\eta c(Qat, P2t/P1r) \quad (10)$$

<Real Compressor Driving Force Calculation Unit 132>

As described above, the real compressor driving force calculation unit 132 calculates the real compressor driving force Pcr, which is the real value of driving force for the compressor 31.

In Embodiment 1, the target compressor driving force calculation unit 132 calculates the real compressor driving force Pcr, based on the real intake air flow rate Qar and the real before/after-compressor pressure ratio P2r/P1r, which is the pressure ratio of the real supercharging pressure P2r and the real atmospheric pressure P1r.

As represented in the after-mentioned equation (11) that is similar to the equation (9) above, the real compressor driving force calculation unit 132 calculates the real compressor driving force Pcr, based on the real intake air flow rate Qar, the real before/after-compressor pressure ratio P2r/P1r, which is the pressure ratio of the real supercharging pressure P2r and the real atmospheric pressure P1r, a real adiabatic efficiency ηcr of the compressor 31, and the real intake air temperature T1r. In this situation, as is the case with the target compressor driving force calculation unit 131, the real compressor driving force calculation unit 132 calculates a pressure ratio correction coefficient F1 corresponding to the real before/after-compressor pressure ratio P2r/P1r, which is the pressure ratio of the real supercharging pressure P2r and the real atmospheric pressure P1r, by use of a pressure ratio correction coefficient map MAPF1 in which the relationship between the pressure ratio correction coefficient F1 and the before/after-compressor pressure ratio P2/P1 is preliminarily set.

$$Pcr = Qar \frac{1}{\eta cr} T1r \cdot F1 \quad (11)$$

$$F1 = MAPF1\left(\frac{P2r}{P1r}\right),$$

$$\because MAPF1\left(\frac{P2}{P1}\right) \cong \frac{\kappa}{\kappa-1} R\left(\left(\frac{P2}{P1}\right)^{\frac{\kappa-1}{\kappa}} - 1\right)$$

The real compressor driving force calculation unit 132 calculates the real adiabatic efficiency ηcr corresponding to the real intake air flow rate Qar and the real before/after-compressor pressure ratio P2r/P1r, by use of the adiabatic efficiency calculation map MAPηc in which as represented in the equation (12) below, the relationship among the intake air flow rate Qa, the before/after-compressor pressure ratio P2/P1, and the adiabatic efficiency ηc of the compressor 31 is preliminarily set. As the adiabatic efficiency calculation map MAPηc, a map the same as the map utilized by the target compressor driving force calculation unit 131 is utilized. It may be allowed that as is the case with the target compressor driving force calculation unit 131, the real compressor driving force calculation unit 132 calculates the real compressor driving force Pcr without considering the change in the adiabatic efficiency ηc, for example, by setting the real adiabatic efficiency ηcr to a fixed value.

$$\eta cr = MAP\eta c(Qar, P2r/P1r) \quad (12)$$

<Supercharger Inertial Force Calculation Unit 133>

As described above, based on the real rotation speed Ntr of the supercharger 36, the supercharger inertial force calculation unit 133 calculates inertial force Pir produced by the inertial moment It of the supercharger 36.

In Embodiment 1, as represented in the equation (13) below, based on the real rotation speed Ntr of the supercharger 36, the supercharger inertial force calculation unit 133 calculates a real rotation acceleration αtr of the supercharger 36, and then calculates the inertial force Pir [W] by multiplying the real rotation acceleration αtr of the supercharger 36 by the inertial moment It of the supercharger 36 and the real rotation speed Ntr of the supercharger 36. The inertial force Pir [W] is power. The supercharger inertial force calculation unit 133 calculates the real rotation acceleration αtr by dividing a changing amount ΔNtr of the real rotation speed Ntr of the supercharger 36 in a preliminarily set interval ΔTn by the interval ΔTn.

$$Pir = \alpha tr \times It \times Ntr$$

$$\alpha tr = \Delta Ntr / \Delta Tn \tag{13}$$

The inertial moment It is the inertial moment of the members (in this example, the turbine 32, the compressor 31, and the turbine shaft 39) that rotate integrally with the turbine 32 and the compressor 31, and is preliminarily set.

<Gate Valve Control Value Calculation Unit 134>

The gate valve control value calculation unit 134 implements driving force feedback control in which the gate valve control value WG is changed so that the inertial force added driving force Pcr* obtained by, as the equation (14), adding the inertial force Pir to the real compressor driving force Pcr approaches the target compressor driving force Pct. Based on the gate valve control value WG, The gate valve control value calculation unit 134 outputs a control signal to the gate valve actuator 34a so as to perform driving control of the wastegate valve 34.

$$Pcr^* = Pcr + Pir \tag{14}$$

As represented in the equation (15) below, the gate valve control value calculation unit 134 implements, as driving force feedback control, PID control for calculating a feedback correction value WGfb through a proportional operation, an integral operation, and a differential operation based on the difference between the target compressor driving force Pct and the inertial force added driving force Pcr*.

$$WGfb = Kp \times \Delta Pc + \int (Ki \times \Delta Pc) dt + Kd \times d(\Delta Pc)/dt$$

$$\Delta Pc = Pct - Pcr^* \tag{15}$$

where Kp, Ki, and Kd are the proportional gain, the integration gain, and the differentiation gain, respectively, and are control gains at a time when PID control is implemented.

It may be allowed that as the driving force feedback control, each of various kinds of feedback controls (e.g., PI control, or learning control in addition to PID control) other than PID control is utilized.

In Embodiment 1, based on the target compressor driving force Pct and the exhaust gas flow rate Qex, the gate valve control value calculation unit 134 calculates a basic gate valve control value WGb, which is the basic value of the gate valve control value WG. Then, as represented in the equation (16) below, the gate valve control value calculation unit 134 calculates, as the final gate valve control value WG, a value obtained by correcting the basic gate valve control value WGb with the feedback correction value WGfb.

$$WG = WGb + WGfb \tag{16}$$

The gate valve control value calculation unit 134 calculates, as the basic gate valve control value WGb, the gate valve control value WG corresponding to the target compressor driving force Pct and the exhaust gas flow rate Qex, by use of a gate valve control value calculation map MAPWG in which as represented in the equation (17) below, the relationship among the compressor driving force Pc, the exhaust gas flow rate Qex, and the gate valve control value WG is preliminarily set.

$$WGb = MAPWG(Pct, Qex) \tag{17}$$

The gate valve control value calculation unit 134 calculates the exhaust gas flow rate Qex, based on the real intake air flow rate Qar and the air-fuel ratio AF. In Embodiment 1, as represented in the equation (18) below, the gate valve control value calculation unit 134 calculates the exhaust gas flow rate Qex, based on the real in-cylinder fresh air amount Qcr calculated based on the real intake air flow rate Qar and the exhaust gas air-fuel ratio AF detected by the air-fuel ratio sensor 16. Instead of Qcr/ΔT, the real intake air flow rate Qar may be utilized; as the air-fuel ratio AF, the target value of the air-fuel ratio AF, which is utilized in the fuel calculation, may be utilized.

$$Qex = \frac{Qcr}{\Delta T}\left(1 + \frac{1}{AF}\right) \tag{18}$$

1-2-4. Control Behavior

The behaviors of controls of the inertial force added driving force Pcr* and the real compressor driving force Pcr will be explained by use of the timing chart in FIG. 8.

Due to an increase in the accelerator opening degree and the like, the target supercharging pressure P2t increases and hence the target compressor driving force Pct increases; then, the turbine output Pt and the real compressor driving force Pcr increase and hence the real supercharging pressure P2r increases. In this situation, because the real rotation speed Ntr of the supercharger 36 increases, the inertial force Pir of the supercharger 36 increases. Although not represented in FIG. 8, due to the driving force feedback control, the gate valve control value WG is changed in accordance with the difference between the target compressor driving force Pct and the inertial force added driving force Pcr*, so that the opening degree of the wastegate valve 34 is changed. Because part of the turbine output Pt is consumed as the inertial force Pir, the output obtained by subtracting the inertial force Pir from the turbine output Pt is the real compressor driving force Pcr, which is driving force consumed by the compressor 31.

In Embodiment 1, there is implemented driving force feedback control in which the gate valve control value WG is changed so that the inertial force added driving force Pcr*, which is obtained by adding the inertial force Pir to the real compressor driving force Pcr and corresponds to the turbine output Pt, approaches the target compressor driving force Pct. Accordingly, as described above, in the feedback control system in which the turbine output Pt is changed, the inertial force Pir, which works as a disturbance component, can be compensated and hence the feedback control can be implemented by use of the inertial force added driving force Pcr* corresponding to the turbine output Pt. Accordingly, for a change in the target compressor driving force Pct, a stable desired transient response of the inertial force added driving force Pcr* can be obtained. In the example represented in FIG. 8, the feedback control gain is adjusted in order to obtain a feedback response in which after overshooting the target compressor driving force Pct, the inertial force added driving force Pcr* approaches the target compressor driving force Pct. Because the real compressor driving force Pcr is the driving force obtained by subtracting the inertial force Pir from the turbine output Pt (the inertial force added driving force Pcr*), the real compressor driving force Pcr becomes smaller than the inertial force added driving force $Pcr^*$ that is overshooting; thus, there can be obtained a transient response in which the amount of overshooting from the target compressor driving force Pct is small. Because an change in the real compressor driving force Pcr and an change in the real supercharging pressure $P2r$ correspond to each other, the amount of overshooting, of the real supercharging pressure $P2r$, that is caused by a change in the target supercharging pressure $P2t$ can be reduced. That is to say, in order to obtain a transient response in which the amount of overshooting of the real compressor driving force Pcr from the target compressor driving force Pct is small, the feedback control gain is adjusted and the transient response of the inertial force added driving force $Pcr^*$ is adjusted.

Figure 8:
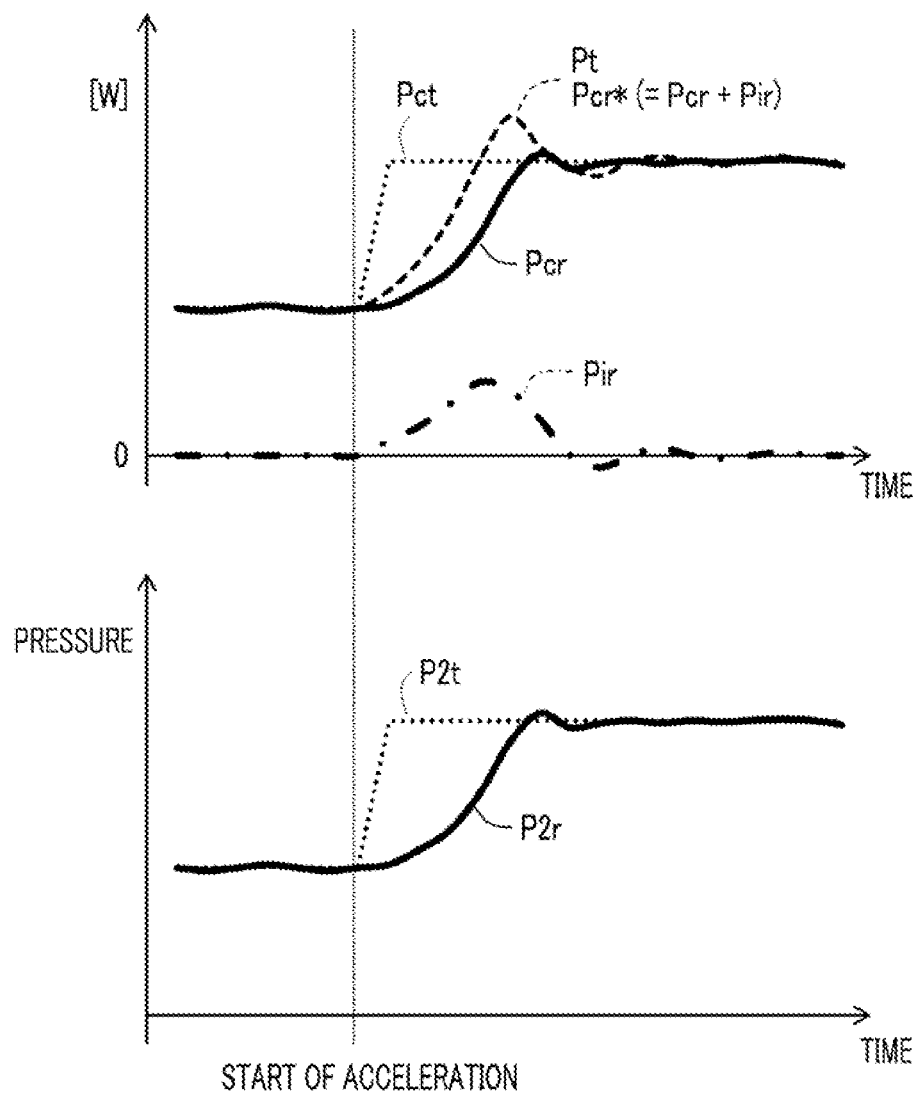
FIG. 8 is a timing chart for explaining a control behavior according to Embodiment 1 of the present invention.

FIG. 8 represents an example of case where the target supercharging pressure $P2t$ increases and hence the target compressor driving force Pct increases; also in the case where the target supercharging pressure $P2t$ decreases and hence the target compressor driving force Pct decreases, there can be obtained a stable transient response in which the inertial force added driving force $Pcr^*$ appropriately undershoots the target compressor driving force Pct. Because the real compressor driving force Pcr becomes larger than the inertial force added driving force $Pcr^*$ that is undershooting, the undershoots of the real compressor driving force Pcr and the real supercharging pressure $P2r$ can be suppressed.

1-2-5. Flowchart

Figure 9:
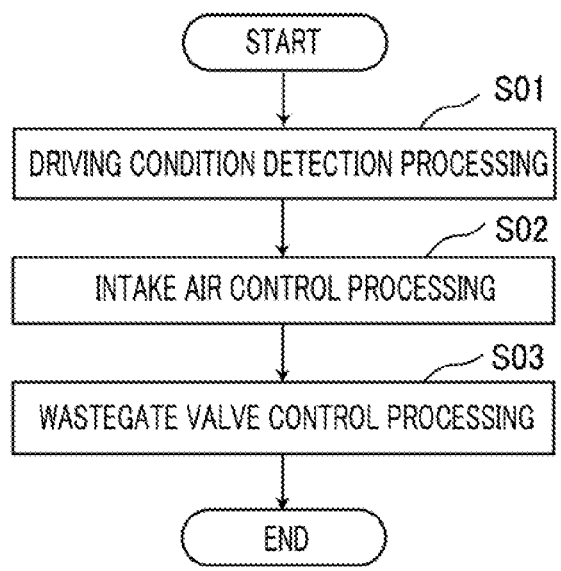
FIG. 9 is a flowchart representing the processing by the controller according to Embodiment 1 of the present invention.
Figure 10:
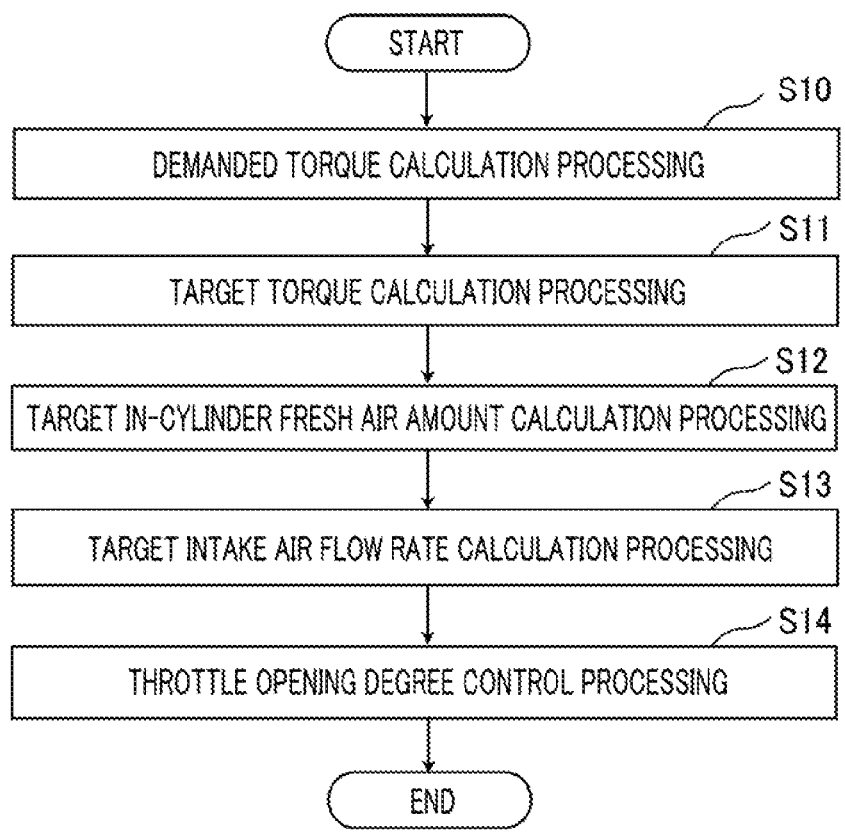
FIG. 10 is a flowchart representing the processing by an intake air control unit according to Embodiment 1 of the present invention.
Figure 11:
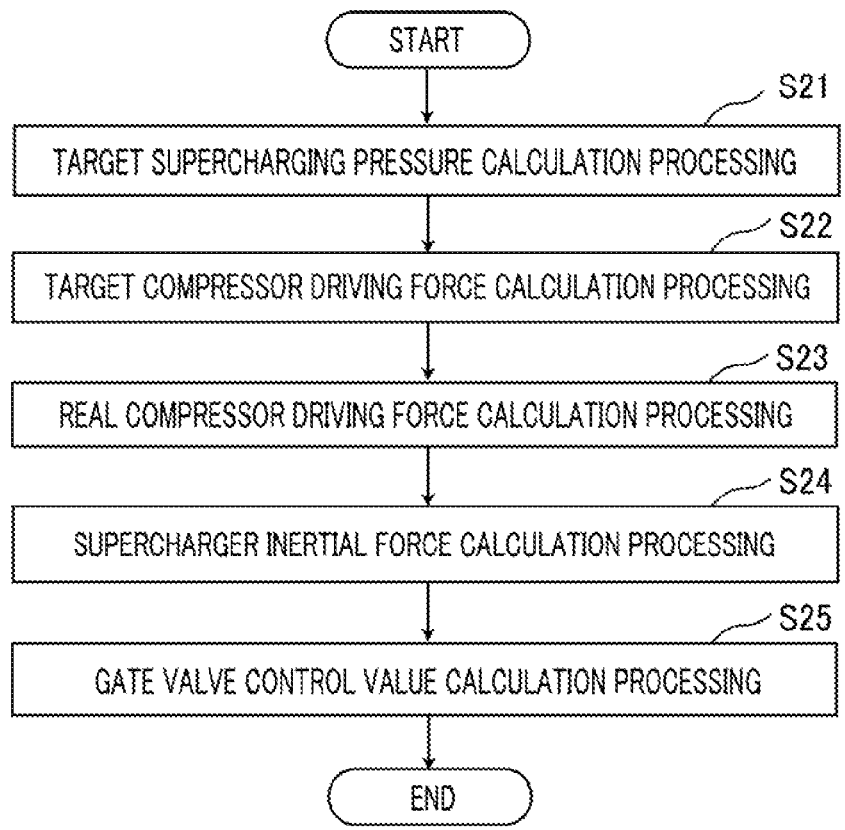
FIG. 11 is a flowchart representing the processing by a wastegate valve control unit according to Embodiment 1 of the present invention.

The procedure of the processing by the controller 100 according to Embodiment 1 will be explained based on the flowcharts in FIGS. 9 through 11. The processing items represented in the flowcharts in FIGS. 9 through 11 are recurrently implemented every constant operation cycle while the computing processing unit 90 implements software (a program) stored in the storage apparatus 91.

At first, the flowchart in FIG. 9 will be explained.

In the step S01, the driving-condition detection unit 110 implements driving condition detection processing (a driving condition detection step) for, as mentioned above, detecting the driving condition of the engine 1. In Embodiment 1, the driving-condition detection unit 110 implements supercharger rotation speed detection processing (a supercharger rotation speed detection step) for detecting the real rotation speed Ntr of the supercharger 36. The driving-condition detection unit 110 detects the real rotation speed Ner of the engine 1, the real intake air flow rate Qar, and the real atmospheric pressure $P1r$. In addition to the foregoing driving conditions, the driving-condition detection unit 110 detects various kinds of driving conditions such as the real intake air temperature $T1r$, the real throttle opening degree THr, the real manifold pressure Pbr, the exhaust gas air-fuel ratio AF, the real supercharging pressure $P2r$, and the accelerator opening degree D. In this situation, the driving-condition detection unit 110 (the real intake air flow rate calculation unit 141) implements real intake air flow rate calculation processing (a real intake air flow rate calculation step) for, as described above, calculating the real intake air flow rate Qar. As mentioned above, the driving-condition detection unit 110 (the real in-cylinder fresh air amount calculation unit 142) implements real in-cylinder fresh air amount calculation processing (a real in-cylinder fresh air amount calculation step) for, as described above, calculating the real charging efficiency Ecr and the real in-cylinder fresh air amount Qcr, based on the output signal of the air flow sensor 12 or the manifold pressure sensor 15.

Next, in the step S02, the intake air control unit 111 implements intake air control processing (an intake air control step) for, as described above, controlling intake air of the engine 1. The intake air control unit 111 calculates the target intake air flow rate Qat and the target charging efficiency Ect. The details of the processing in the step S02 will be represented in the flowchart in FIG. 10. In the step S10, the demanded torque calculation unit 120 implements demanded torque calculation processing (a demanded torque calculation step) for, as described above, calculating the demanded output torque TRQd, based on the accelerator opening degree D, a demand from an external controller, and the like. Next, in the step S11, the target torque calculation unit 121 implements target torque calculation processing (a target torque calculation step) for, as described above, calculating the target output torque TRQt or the target indicated mean effective pressure Pit, based on the demanded output torque TRQd. Then, in the step S12, the target in-cylinder fresh air amount calculation unit 122 implements target in-cylinder fresh air amount calculation processing (a target in-cylinder fresh air amount calculation step) for, as described above, calculating the target charging efficiency Ect and the target in-cylinder fresh air amount Qct, based on the target output torque TRQt or the target indicated mean effective pressure Pit. In the step S13, the target intake air flow rate calculation unit 123 implements target intake air flow rate calculation processing (a target intake air flow rate calculation step) for, as described above, calculating the target intake air flow rate Qat, based on the target in-cylinder fresh air amount Qct. In the step S14, the throttle opening degree control unit 124 implements throttle opening degree control processing (a throttle opening degree control step) for, as described above, controlling the throttle opening degree, based on the target intake air flow rate Qat.

Next, in the step S03 in FIG. 9, the wastegate valve control unit 112 implements wastegate valve control processing (a wastegate valve control step) for, as described above, performing driving control of the wastegate valve 34 so as to control the supercharging pressure P2. The details of the processing in the step S03 will be represented in the flowchart in FIG. 11. In the step S21, the target supercharging pressure calculation unit 135 implements target supercharging pressure calculation processing (a target supercharging pressure calculation step) for, as described above, calculating the target supercharging pressure $P2t$, based on the target charging efficiency Ect and the real rotation speed Ner. In the step S22, the target compressor driving force calculation unit 131 implements target compressor driving force calculation processing (a target compressor driving force calculation step) for calculating the target compressor driving force Pct. In Embodiment 1, as described above, the target compressor driving force calculation unit 131 calculates the target compressor driving force Pct, based on the target intake air flow rate Qat calculated through the intake air control step and the target before/after-compressor pressure ratio $P2t/P1r$, which is the pressure ratio of the target supercharging pressure $P2t$ and the real atmospheric pressure $P1r$.

In the step S23, the real compressor driving force calculation unit 132 implements real compressor driving force calculation processing (a real compressor driving force calculation step) for calculating the real compressor driving force Pcr. In Embodiment 1, as described above, the target compressor driving force calculation unit 132 calculates the real compressor driving force Pcr, based on the real intake air flow rate Qar and the real before/after-compressor pressure ratio $P2r/P1r$, which is the pressure ratio of the real supercharging pressure $P2r$ to the real atmospheric pressure $P1r$.

In the step S24, the supercharger inertial force calculation unit 133 implements supercharger inertial force calculation processing (a supercharger inertial force calculation step) for, as described above, calculating inertial force Pir produced by the inertial moment It of the supercharger 36, based on the real rotation speed Ntr of the supercharger 36.

Then, in the step S25, the gate valve control value calculation unit 134 implements gate valve control value calculation processing (a gate valve control value calculation step) for performing driving force feedback control in which, as described above, the gate valve control value WG is changed so that the inertial force added driving force Pcr* obtained by adding the inertial force Pir to the real compressor driving force Pcr approaches the target compressor driving force Pct, and performs driving control of the wastegate valve 34 based on the gate valve control value WG.

In Embodiment 1, the gate valve control value calculation unit 134 implements basic control value calculation processing for, as described above, calculating a basic value WGb of the gate valve control value WG, based on the target compressor driving force Pct and the exhaust gas flow rate Qex, and then calculates, as the final gate valve control value WG, a value by correcting the basic value WGb through driving force feedback control.

2. Embodiment 2

In Embodiment 2, the supercharger inertial force calculation unit 133 calculates, as the final inertial force Pir, a value obtained by applying upper/lower limitation with preliminarily set upper limit and lower limit values Pimax and Pimin to a calculation value of the inertial force Pir, which is calculated based on the real rotation speed Ntr of the supercharger 36. The other configurations are the same as those in Embodiment 1 described above; therefore, the explanation therefor will be omitted.

The accuracy of calculating the inertial force Pir is deteriorated due to an error, in detecting the real rotation speed Ntr of the supercharger 36, that is caused by noise components included in the output signal of the rotation speed sensor 42 for the supercharger 36 and deterioration of the accuracy of detecting the real rotation speed Ntr of the supercharger 36 at a time when the real rotation speed Ntr of the supercharger 36 is detected (estimated) based on the real intake air flow rate Qar and the real before/after-compressor pressure ratio P2r/P1r. As a result, the accuracy of calculating the inertial force added driving force Pcr* that is calculated by adding the inertial force Pir to the real compressor driving force Pcr is deteriorated; thus, the controllability of driving force feedback control may be lowered.

In Embodiment 2, as described above, the inertial force added driving force Pcr* is calculated by use of the inertial force Pir to which upper/lower limitation has been applied; therefore, it is made possible to prevent the inertial force Pir utilized for calculation of the inertial force added driving force Pcr* from excessively increasing in the positive or negative side, due to noise components in the output signal of the rotation speed sensor 42 for the supercharger 36 and the deterioration of accuracy of estimating the real rotation speed Ntr of the supercharger 36; as a result, the controllability of the driving force feedback control can be suppressed from being deteriorated. The upper limit value Pimax is set to a positive value, and the lower limit value Pimin is set to a negative value.

Figure 12:
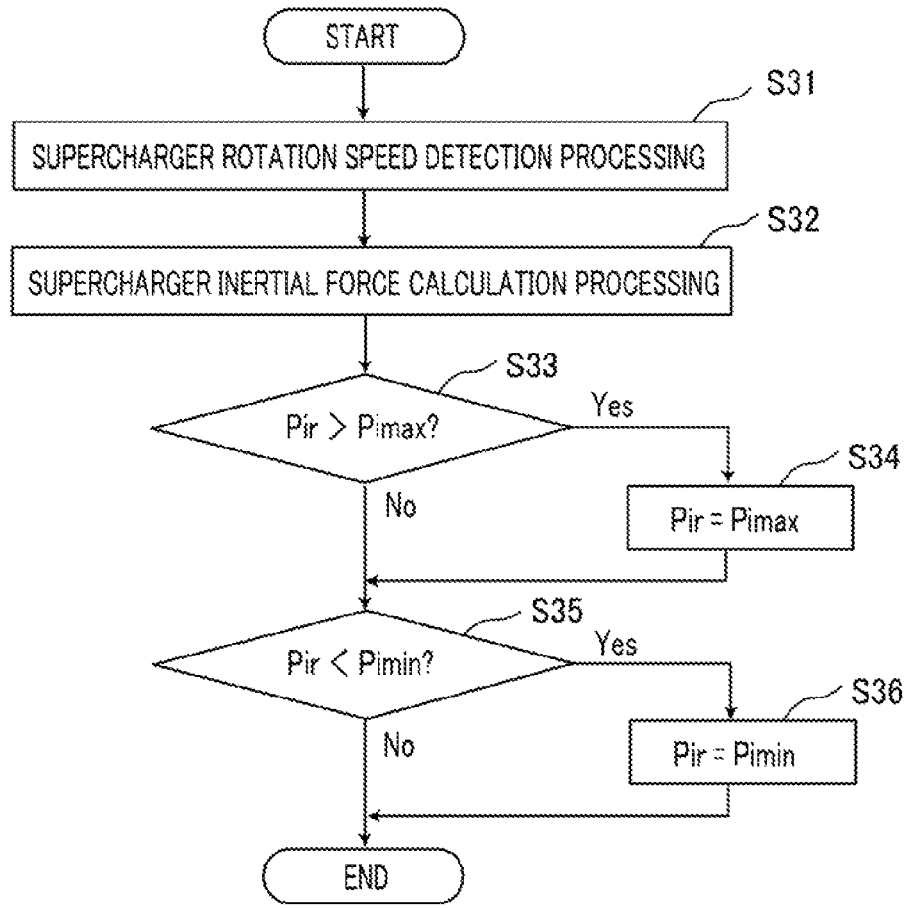
FIG. 12 is a flowchart representing the processing by a supercharger inertial force calculation unit according to Embodiment 2 of the present invention.

The upper/lower limitation processing by the supercharger inertial force calculation unit 133 according to Embodiment 2 can be configured as the flowchart represented in FIG. 12.

In the step S31, as is the case with Embodiment 1, the driving-condition detection unit 110 implements supercharger rotation speed detection processing (a supercharger rotation speed detection step) for detecting the real rotation speed Ntr of the supercharger 36. In Embodiment 2, the supercharger inertial force calculation unit 133 detects the real rotation speed Ntr of the supercharger 36, based on the output signal of the rotation speed sensor 42 for the supercharger 36. Alternatively, as explained in Embodiment 1, the driving-condition detection unit 110 may detect (estimate) the real rotation speed Ntr of the supercharger 36, based on the real intake air flow rate Qar and the real before/after-compressor pressure ratio P2r/P1r.

In the step S32, as is the case with Embodiment 1, the supercharger inertial force calculation unit 133 implements supercharger inertial force calculation processing (a supercharger inertial force calculation step) for calculating inertial force Pir produced by the inertial moment It of the supercharger 36, based on the real rotation speed Ntr of the supercharger 36.

In the step S33, the supercharger inertial force calculation unit 133 determines whether or not the calculation value of the inertial force Pir, which has been calculated in the step S32, is larger than the preliminarily set upper limit value Pimax. In the case where it is determined that the calculation value of the inertial force Pir is larger than the upper limit value Pimax (in the step S33: Yes), the supercharger inertial force calculation unit 133 replaces the calculation value of the inertial force Pir by the upper limit value Pimax (the step S34). In contrast, in the case where it is determined that the calculation value of the inertial force Pir is not larger than the upper limit value Pimax (in the step S33: No), the supercharger inertial force calculation unit 133 determines whether or not the calculation value of the inertial force Pir is smaller than the preliminarily set lower limit value Pimin (the step S35). In the case where it is determined that the calculation value of the inertial force Pir is smaller than the lower limit value Pimin (in the step S35: Yes), the supercharger inertial force calculation unit 133 replaces the calculation value of the inertial force Pir by the lower limit value Pimin (the step S36). In contrast, in the case where it is determined that the calculation value of the inertial force Pir is not smaller than the lower limit value Pimin (in the step S35: No), the supercharger inertial force calculation unit 133 adopts the calculation value of the present inertial force Pir, as the final inertial force Pir, and then ends the processing.

3. Embodiment 3

In Embodiment 3, in the case where the calculation value Pir* calculated based on the real rotation speed Ntr of the supercharger 36 is within a preliminarily set falling range including zero, the supercharger inertial force calculation unit 133 adopts, as the final inertial force Pir, a value decreased so as to be smaller than the calculation value Pir*. The other configurations are the same as those in Embodiment 1 described above; therefore, the explanation therefor will be omitted.

Even in the steady-driving mode where the real compressor driving force Pcr keeps track of the target compressor driving force Pct, noise components included in the output signal of the rotation speed sensor 42 for the supercharger 36 may cause the real rotation speed Ntr to vibrate and hence the inertial force Pir may vibrate. when the vibration of the inertial force Pir becomes large, the vibration of the inertial force added driving force Pcr* to be calculated by adding the inertial force Pir to the real compressor driving force Pcr becomes large; therefore, even in the steady-driving mode, the real compressor driving force Pcr may vibrate and hence the real supercharging pressure P2r may vibrate. In addition, even in the case where the real rotation speed Ntr of the supercharger 36 is detected (estimated) based on the real intake air flow rate Qar and the real before/after-compressor pressure ratio P2r/P1r, estimation error components may cause the real rotation speed Ntr of the supercharger 36 to vibrate; thus, in the same manner, even in the steady-driving mode, the real compressor driving force Pcr may vibrate and hence the real supercharging pressure P2r may vibrate.

As described above, in the case where the calculation value Pir* of the inertial force Pir is within a falling range including zero, the supercharger inertial force calculation unit 133 adopts, as the final inertial force Pir, a value decreased so as to be smaller than the calculation value Pir*; therefore, the vibration of the inertial force added driving force Pcr* can be reduced in the steady-driving mode. Accordingly, in the steady-driving mode, the real compressor driving force Pcr can be suppressed from vibrating and hence the real supercharging pressure P2r can be suppressed from vibrating.

Figure 13:
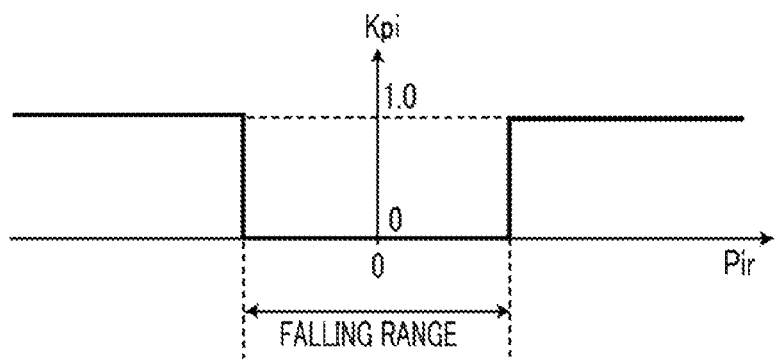
FIG. 13 is a graph for explaining a reflection coefficient map according to Embodiment 3 of the present invention.

In Embodiment 3, in the case where the calculation value Pir* of the inertial force Pir is within a falling range including zero, the supercharger inertial force calculation unit 133 adopts zero, as the final inertial force Pir. For example, as represented in the equation (19) below, the supercharger inertial force calculation unit 133 calculates a reflection coefficient Kpi corresponding to the calculation value Pir* of the inertial force Pir, by use of a reflection coefficient map MAPKpi in which the relationship, as represented in FIG. 13, between the inertial force Pir and the reflection coefficient Kpi is preliminarily set. In the reflection coefficient map MAPKpi, in the case where the value of the inertial force Pir is within a falling range including zero, the reflection coefficient Kpi is set to zero, and in the case where the value of the inertial force Pir is out of the falling range, the reflection coefficient Kpi is set to "1". Then, as represented in the equation (19) below, the supercharger inertial force calculation unit 133 adopts, as the final inertial force Pir, a value obtained by multiplying the calculation value Pir* of the inertial force Pir by the reflection coefficient Kpi.

$$Kpi=MAPKpi(Pir*)$$

$$Pir=Kpi \times Pir* \qquad (19)$$

Figure 14:
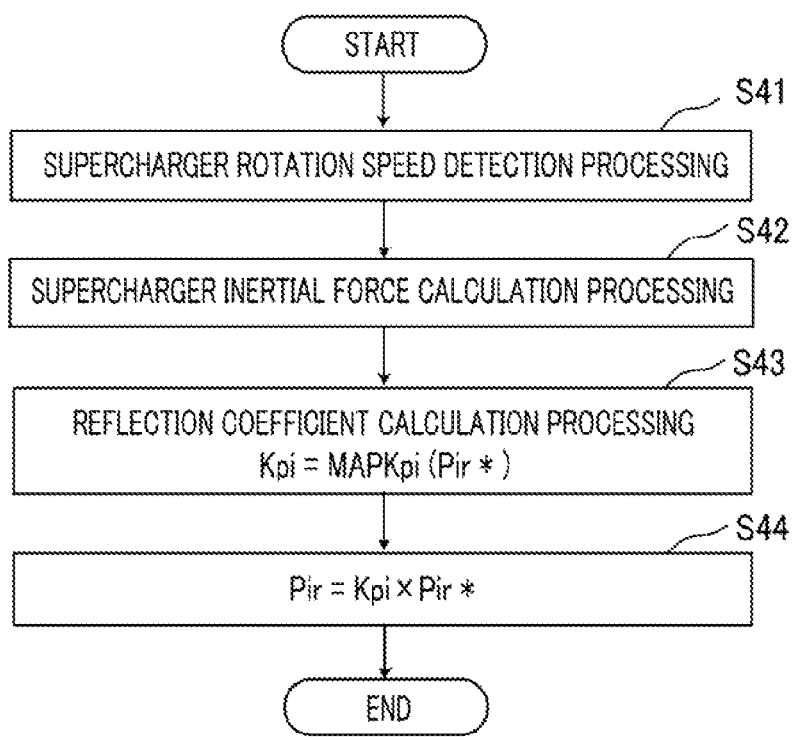
FIG. 14 is a flowchart representing the processing by a supercharger inertial force calculation unit according to Embodiment 3 of the present invention.

The processing by the supercharger inertial force calculation unit 133 according to Embodiment 3 can be configured as the flowchart represented in FIG. 14.

In the step S41, as is the case with Embodiment 1, the driving-condition detection unit 110 implements supercharger rotation speed detection processing (a supercharger rotation speed detection step) for detecting the real rotation speed Ntr of the supercharger 36. In Embodiment 3, the supercharger inertial force calculation unit 133 detects the real rotation speed Ntr of the supercharger 36, based on the output signal of the rotation speed sensor 42 for the supercharger 36. Alternatively, as explained in Embodiment 1, the driving-condition detection unit 110 may detect (estimate) the real rotation speed Ntr of the supercharger 36, based on the real intake air flow rate Qar and the real before/after-compressor pressure ratio P2r/P1r.

In the step S42, as is the case with Embodiment 1, the supercharger inertial force calculation unit 133 implements supercharger inertial force calculation processing (a supercharger inertial force calculation step) for calculating inertial force Pir* produced by the inertial moment It of the supercharger 36, based on the real rotation speed Ntr of the supercharger 36.

In the step S43, as described above, the supercharger inertial force calculation unit 133 implements reflection coefficient calculation processing (a reflection coefficient calculation step) for calculating the reflection coefficient Kpi corresponding to the calculation value Pir* of the inertial force Pir, which has been calculated in the step S42, by use of the reflection coefficient map MAPKpi.

Then, in the step S43, the supercharger inertial force calculation unit 133 calculates, as the final inertial force Pir, a value obtained by multiplying the calculation value Pir* of the inertial force Pir, which has been calculated in the step S42, by the reflection coefficient Kpi; then, the supercharger inertial force calculation unit 133 ends the processing.

In the present invention, a "map" denotes a function that represents the relationship between or among a plurality of variables; instead of a map, a polynomial, a mathematical expression, a data table, or the like can be utilized.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine equipped with a supercharger having a turbine provided in an exhaust path, a compressor that is provided at the upstream side of a throttle valve in an intake path and rotates integrally with the turbine, a wastegate valve provided in a bypass, in the exhaust path, that bypasses the turbine, and a gate valve actuator that drives the wastegate valve, the controller comprising at least one processor configured to implement:
   a driving-condition detector that detects a real rotation speed of the supercharger;
   a target compressor driving force calculator that calculates a target compressor driving force, which is a target value of driving force for the compressor;
   a real compressor driving force calculator that calculates real compressor driving force, which is a real value of driving force for the compressor;
   a supercharger inertial force calculator that calculates inertial force produced by an inertial moment of the supercharger, based on the real rotation speed of the supercharger; and
   a gate valve control value calculator that implements driving force feedback control for changing a gate valve control value, which is a control value for the gate valve actuator, so that an addition value obtained by adding the inertial force to the real compressor driving force approaches the target compressor driving force, and controls the gate valve actuator to drive the wastegate valve based on the gate valve control value.

2. The controller for the internal combustion engine equipped with the supercharger according to claim 1, wherein the supercharger inertial force calculator adopts, as a final inertial force, a value obtained by applying upper/lower limitation with preliminarily set upper limit and lower limit values to the calculation value of the inertial force, which is calculated based on the real rotation speed of the supercharger.

3. The controller for the internal combustion engine equipped with the supercharger according to claim 1, wherein in the case where the calculation value of the inertial force, calculated based on the real rotation speed of the supercharger, is within a preliminarily set falling range including zero, the supercharger inertial force calculator adopts, as a final inertial force, a value decreased so as to be smaller than the calculation value.

4. The controller for the internal combustion engine equipped with the supercharger according to claim 1, wherein based on the real rotation speed of the supercharger, the supercharger inertial force calculator calculates a real rotation acceleration of the supercharger, and then calculates, as the inertial force, a value obtained by multiplying the real rotation acceleration of the supercharger by the inertial moment and the real rotation speed of the supercharger.

5. The controller for the internal combustion engine equipped with the supercharger according to claim 1,
wherein the driving-condition detector detects a real intake air flow rate of the internal combustion engine, a real atmospheric pressure, and a real supercharging pressure that is a real value of a supercharging pressure, which is a pressure at a position, in the intake path, that is at the downstream side of the compressor and at the upstream side of the throttle valve, and
wherein the real compressor driving force calculator calculates the real compressor driving force, based on the real intake air flow rate and a real before/after-compressor pressure ratio, which is the pressure ratio of the real supercharging pressure and the real atmospheric pressure.

6. The controller for the internal combustion engine equipped with the supercharger according to claim 1,
wherein the driving-condition detector detects the real rotation speed of the supercharger, based on an output signal of a rotation speed sensor provided in the supercharger, and
wherein, alternatively, the driving-condition detector detects a real intake air flow rate of the internal combustion engine, a real atmospheric pressure, and a real supercharging pressure that is a real value of a supercharging pressure, which is a pressure at a position, in the intake path, that is at the downstream side of the compressor and at the upstream side of the throttle valve, and then detects the real rotation speed of the supercharger, based on the real intake air flow rate, the real before/after-compressor pressure ratio, which is the pressure ratio of the real supercharging pressure and the real atmospheric pressure.

7. The controller for the internal combustion engine equipped with the supercharger according to claim 1, wherein the at least one processor is further configured to implement:
an intake air controller that calculates a target intake air flow rate and a target charging efficiency of the internal combustion engine; and
a target supercharging pressure calculator that calculates a target supercharging pressure, which is a target value of a supercharging pressure that is the pressure at a position, in the intake path, that is at the downstream side of the compressor and at the upstream side of the throttle valve, based on the target charging efficiency and a real rotation speed of the internal combustion engine, which is detected by the driving-condition detector,
wherein the target compressor driving force calculator calculates the target compressor driving force, based on the target intake air flow rate and a target before/after-compressor pressure ratio, which is the pressure ratio of the target supercharging pressure and the real atmospheric pressure detected by the driving-condition detector, and
wherein the gate valve control value calculator calculates an exhaust gas flow rate discharged from the internal combustion engine, based on a real intake air flow rate of the internal combustion engine, which is detected by the driving-condition detector, and an air-fuel ratio of the internal combustion engine, calculates a basic value of the gate valve control value, based on the target compressor driving force and the exhaust gas flow rate, and then calculates, as a final gate valve control value, a value obtained by correcting the basic value through the driving force feedback control.

\* \* \* \* \*